United States Patent [19]
Malow

[11] Patent Number: 5,730,270
[45] Date of Patent: Mar. 24, 1998

[54] SWIVELING-DEFLECTOR SWITCHING DEVICE

[75] Inventor: Siegmar Malow, Dettingen, Germany

[73] Assignee: Licentia Patent-Verwaltungs-GmbH, Frankfurt, Germany

[21] Appl. No.: 578,601

[22] PCT Filed: May 4, 1995

[86] PCT No.: PCT/EP95/01690

§ 371 Date: Jan. 4, 1996

§ 102(e) Date: Jan. 4, 1996

[87] PCT Pub. No.: WO95/30614

PCT Pub. Date: Nov. 16, 1995

[30] Foreign Application Priority Data

May 5, 1994 [DE] Germany ............. 44 15 788.6

[51] Int. Cl.$^6$ ........................................ B65G 11/20
[52] U.S. Cl. ....................... 193/31 A; 198/367; 198/442
[58] Field of Search .................... 193/31 A; 198/367, 198/442, 890.1

[56] References Cited

U.S. PATENT DOCUMENTS 2,265,261 12/1941 Bergmann ................. 198/367
3,465,870 9/1969 Paulsen .
3,731,796 5/1973 Smith ..................... 193/31 A
4,830,173 5/1989 Hartness et al. ............. 198/442

FOREIGN PATENT DOCUMENTS 1257557 7/1989 Canada .

Primary Examiner—Joseph E. Valenza
Attorney, Agent, or Firm—Spencer & Frank

[57] ABSTRACT

A switching device with a swiveling deflector for delivering goods to be transported from one of at least two delivery channels. The swiveling deflector is positioned at the free end of a leaf spring clamped into a bearing block. The force is introduced into the swiveling deflector, and the surface of the swiveling deflector has a predetermined curvature. The cross section of the swiveling deflector is tapered in the direction counter to the bearing block, and the bearing block has a horn-like shape. The bearing block and the swiveling deflector have respective concave and convex connecting regions in the bearing region of the leaf spring, and wherein the bearing block has a recess that extends along one region of the leaf spring, within which the leaf spring is freely movable during the swiveling movement.

5 Claims, 1 Drawing Sheet

SWIVELING-DEFLECTOR SWITCHING DEVICE

The invention relates to a switching device in accordance with the preamble of patent claim 1.

DE 41 03 849 has disclosed a swivel-out device which permits a rapid, stop-free swiveling operation without the need for damping stops at the end of the swiveling movement. This device has a coupling triangle in which two corners are arranged on the piston rods of actuating cylinders, the casings of the actuating cylinders forming the fixed points for the swiveling movement of the coupling triangle. Damping during swiveling is obtained by the use of pneumatic cylinders.

It is the object of the present invention to provide a switching device with a swiveling deflector which permits a rapid, damped swiveling movement of the swiveling deflector without the need for damping stops at the end of the swiveling movement.

With the above object in view, the present invention resides in a switching device with a swiveling deflector for delivering goods to be transported from one of at least two delivery channels, wherein the swiveling deflector is positioned at the free end of a leaf spring clamped into a bearing block, wherein the force is introduced into the swiveling deflector, wherein the surface of the swiveling deflector has a predetermined curvature and the cross section of the swiveling deflector is tapered in the direction counter to the bearing block, wherein the bearing block has a horn-like shape, wherein the bearing block and the swiveling deflector have respective concave and convex connecting regions in the bearing region of the leaf spring, and wherein the bearing block has a recess that extends along one region of the leaf spring, within which the leaf spring is freely movable during the swiveling movement.

Further advantageous embodiments of the invention can be taken from the subclaims, the description and the attached drawings.

A particularly advantageous feature of the invention is that play-free, flexurally and torsionally rigid swivel-mounting of the swiveling deflector is achieved in a manner such that a build-up of restoring forces takes place in the bearing when the swiveling deflector is rotated out of the central position in either direction. Attention should be drawn, in particular, to the fact that this has made possible the integration of the functions of "mounting" and "build-up of restoring forces".

It is advantageous if the force for executing a swiveling movement is introduced by means of a fixing element which is arranged ridigly on the swiveling deflector and is connected to the piston rod of a movement cylinder.

Flexible kinetic dimensioning of the switching device is advantageously achieved by means of punched-out regions of the spring at certain points.

A particularly simple means of securing the leaf spring on the swiveling deflector and in the bearing block is achieved by clamping the leaf spring in each case into a slot.

In order to permit unhindered movement of the leaf spring over a sufficiently wide range and to adjust the natural frequency of the system, it is advantageous to provide within the bearing block a recess which extends along one region of the leaf spring and within which the leaf spring is freely movable during the swiveling movement.

The switching device can be used to advantage in a conveying device for discharging transported material from a delivery channel or, in a chute device, for discharging transported material into one of two discharge channels.

An exemplary embodiment of the invention is described below with reference to drawings, in which.

Figure 1:
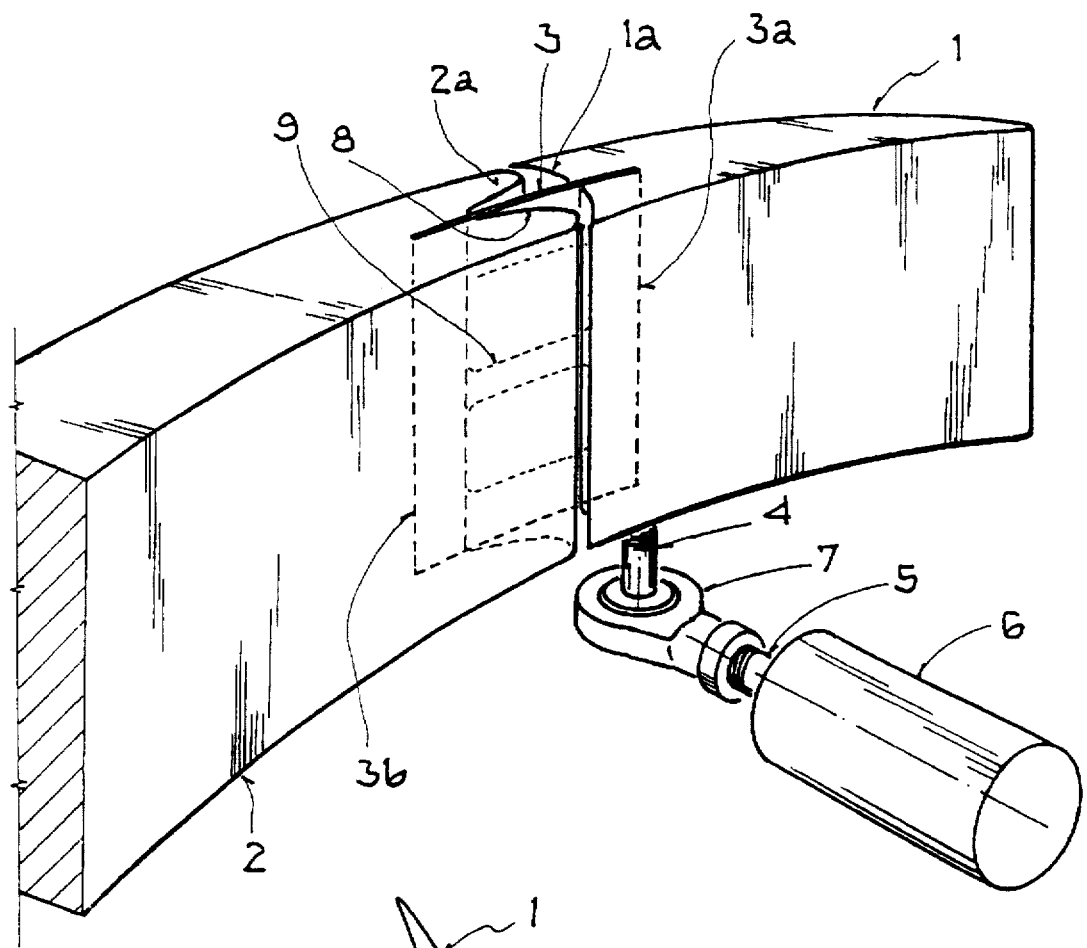
FIG. 1 shows a side view of a switching device according to the invention.
Figure 2:
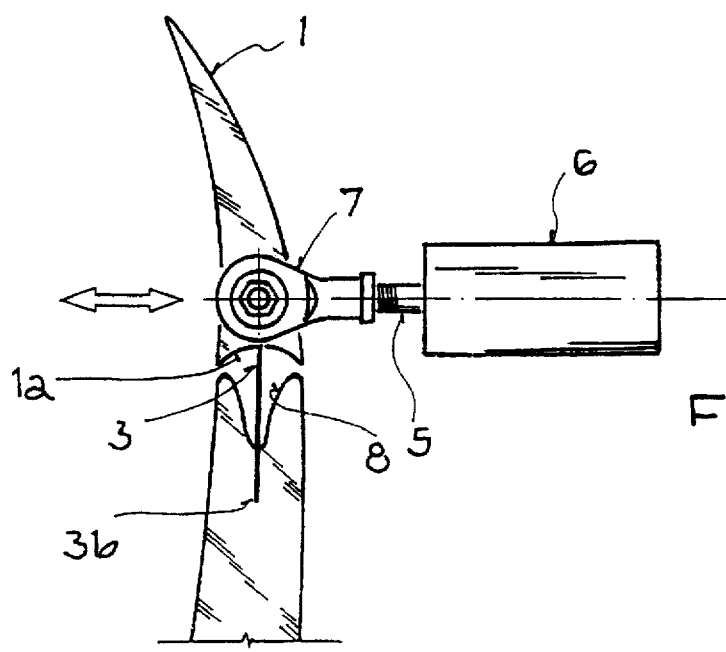
FIG. 2 shows a bottom view of a switching device according to the invention.

In FIG. 1, 1 denotes a swiveling deflector which is attached to a bearing block 2. A leaf spring 3 is provided as a mounting, being attached to the swiveling deflector on a first side 3a and to the bearing block on a second side situated opposite the first. The force for executing the swiveling movement is introduced directly into the swiveling deflector. This can be accomplished, in particular, by connecting a fixing element 4, the said fixing element being rigidly attached to the swiveling deflector, to the piston rod 5 of a movement cylinder 6. The fixing element 4 may, for example, be of essentially stud-shaped design. A hinge head 7 is provided for the purpose of connection.

To provide more flexible dimensioning, the leaf spring 3 may have regions 9 which are punched out at certain points.

In general, the switching device interacts with one or more delivery or discharge channels, but these are not shown in the drawings. In order to match these channels and, furthermore, also the kinematics and dynamics of the discharge operation, the surface of the swiveling deflector has a predetermined curvature which tapers in the opposite direction to the bearing block.

The bearing block can be given a horn-like shape, e.g. that of the central horn of a chute with two discharge channels.

In order to permit unhindered movement of the swiveling deflector relative to the bearing block, the swiveling deflector and the bearing block have mutually assigned convex and concave connecting regions 1a, 2a, respectively, in the region where the swiveling movement is initiated.

The leaf spring may be attached to the bearing block and to the swiveling deflector in various ways. In particular, it may in each case be screwed, bolted or encapsulated. Clamping the leaf spring into a slot in the swiveling deflector and in the bearing block, respectively, is particularly advantageous.

In order to vary the natural frequency of the oscillatory system comprising leaf spring and swiveling deflector and adjust it in accordance with the practical requirements of the application, the bearing block 2 has provided in it a recess 8 which extends along one region of the leaf spring 3 and within which the leaf spring 3 is freely movable during the swiveling movement. This recess is matched to the amplitude of the movement impressed upon the system by the movement cylinder.

A movement of the piston rod 5 essentially parallel to the axis of the movement cylinder 6 imposes a swiveling movement on the swiveling deflector 1. In the process, retarding restoring forces arise in accordance with the deflection of the leaf spring from the position of equilibrium. The achievable switchover time of the switching device is essentially determined by, and adjustable by, means of the mass of the switch deflector, the spring force, the force of the movement cylinder and geometrical factors, in particular the linear design of the freely movable leaf-spring region.

The use of a switching device according to the invention is advantageous in the case of a conveying device with a switching device for discharging transported material from a delivery channel. For the purpose of discharge, the swiveling deflector is swiveled into the delivery channel, the transported material thus being deflected and moved out of the delivery channel.

The switching device according to the invention can furthermore be used in a chute device with an inlet region and a switching device for discharging transported material into one of two discharge channels. Here, the bearing block is designed as a central horn which separates the two interchangeable channels.

The force for the swiveling movement of the swiveling deflector can also be introduced by subjecting the swiveling deflector in a suitable manner to electric or magnetic fields.

I claim:

1. A switching device with a swiveling deflector for delivering goods to be transported from one of at least two delivery channels, said swiveling deflector being positioned at the free end of a leaf spring clamped into a bearing block, the force being introduced into said swiveling deflector, wherein the surface of said swiveling deflector having a predetermined curvature and the cross section of said swiveling deflector being tapered in the direction counter to said bearing block, said bearing block having a horn-like shape, said bearing block and swiveling deflector having respective concave and convex connecting regions in the bearing region of said leaf spring, said bearing block having a recess that extends along one region of said leaf spring, within which the leaf spring is freely movable during the swiveling movement.

2. A device according to claim 1, further comprising a fixing element at said swiveling deflector for receiving the force introduction, said fixing element being connected to the piston rod of a movement cylinder.

3. A device according to claim 1, wherein said leaf spring has regions that are punched out at predetermined points.

4. A device according to the claim 1, wherein said leaf spring has first and second sides which are clamped into a slot in said swiveling deflector and a slot in said bearing block, respectively.

5. A device according to the claim 3, wherein said leaf spring has first and second sides which are clamped into a slot in said swiveling deflector and a slot in said bearing block, respectively.

* * * * *